Patented May 31, 1932

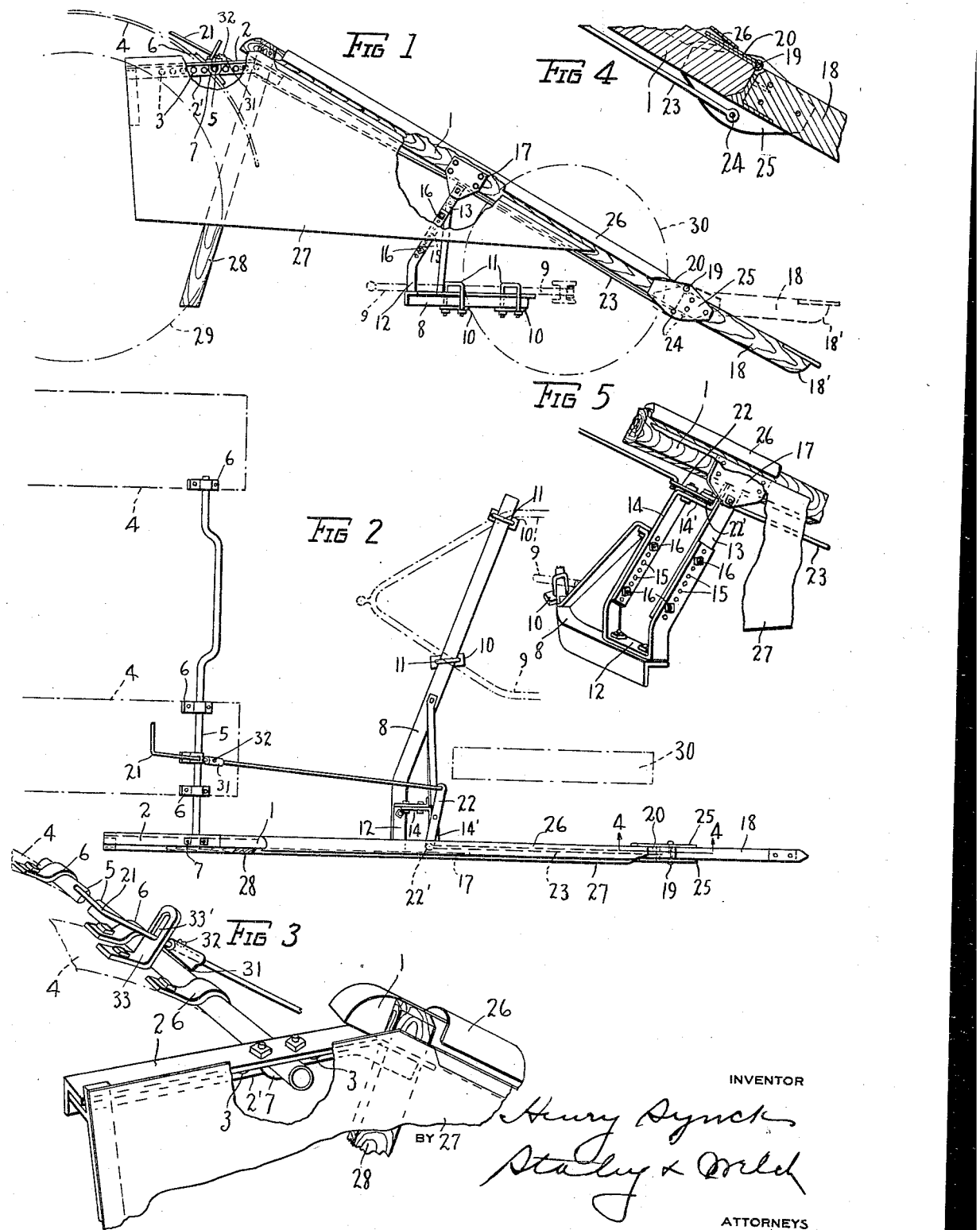

1,860,633

UNITED STATES PATENT OFFICE

HENRY SYNCK, OF COLDWATER, OHIO, ASSIGNOR TO THE NEW IDEA SPREADER COMPANY, OF COLDWATER, OHIO, A CORPORATION OF OHIO

CORN LIFTER

Application filed September 23, 1929. Serial No. 394,401.

This invention relates to improvements in plant lifters, it especially relating to a lifting device for down corn which may be readily attached to the conventional form of farm tractor.

In harvesting corn by means of a tractor-drawn corn picker, particularly in fields in which a considerable percentage of the corn is down, much loss is occasioned by the tractor running over the down corn stalks, since the tractor must be operated near an unpicked row in order to properly position the picker apparatus.

The object of the invention is to provision of a device which may be readily attached to the tractor and which will act to turn and lift the down corn out of the path of the tractor wheels and to hold the same in upright position while the tractor is passing to thereby prevent injury to the corn stalks by the tractor and to act as an aid in guiding the corn stalks properly to the gathering mechanism of the picker machine.

Other objects and advantages will appear from the following description and claims.

In the accompanying drawings:

Fig. 1 is a side elevation of so much of a tractor as is necessary to illustrate the installation of my improvements which are shown applied thereto.

Fig. 2 is a top plan view.

Fig. 3 is a rear perspective view, enlarged, of a portion of the details of the device.

Fig. 4 is an enlarged longitudinal section on the line 4—4 of Fig. 2.

Fig. 5 is an enlarged perspective view of a portion of the details of the device.

Referring to the drawings, 1 represents a beam, in the present case of wood, which is rigidly and stationarily supported from the tractor in a downwardly inclined position, parallel to the longitudinal center line of the tractor. Supporting means having provision for adjustment are provided in order to facilitate the attachment of the device to tractors of various types and sizes.

For that purpose the beam 1 has secured at its upper end a metallic bar 2 of angle section, in the downwardly extending leg 2′ of which are a number of openings 3. The upper end of the beam 1 is preferably supported on the fenders 4 of the tractor, there being a rod 5 secured thereto by formed clips 6. The rod 5 projects outwardly from the fender, as noted in Fig. 2, and the bar 2 is placed on the rod, the rod being inserted in a suitable opening 3 and there rigidly secured by means of a U-bolt 7 passing through the horizontal leg of the bar 2.

The lower forward end of the beam 1 is preferably supported on the radius rods for the front axle of the tractor, and with means whereby the height may be adjustably varied in order that the extreme lower end shall be clear of the ground. A horizontal angle bar 8 is secured to the radius rods 9 by clips 10 and U-bolts 11 so that its position may be adjustably arranged. To the outer end of this bar is fixed an adjustable bracket, this bracket consisting of a U-shaped member 12 having adjustably connected with the legs thereof members 13 and 14, said legs and members being each provided with a series of openings 15 to receive bolts 16 whereby the height of the members 13 and 14 may be varied. The member 13 is a straight piece while the member 14 is formed with two right-angle bends so that its extreme upper portion is parallel with and adjacent the member 13. A plate 17 is secured to the beam 1 and through it and the adjacent upper ends of the members 13 and 14 a bolt is passed.

The forward end of the beam has an extension 18 and to enable the extension to accommodate itself to the changing contour of the ground or to obstructions met with during the travel of the tractor it is hinged on a pin 19 mounted in hinge straps 20 which are secured to the forward end of the beam, the joint being so arranged that the rounded tip 18′ touching the ground tends to lift the extension and thus avoids breakage. Provision is made to raise and lower this extension 18 from the driver's seat on the tractor, there being a pull-rod 21 within convenient reach of the operator.

The pull-rod 21 is pivotally connected with a double-armed lever 22 which is pivotally secured to the horizontally extended portion 14' of the member 14, and to the opposite end 22' a rod 23 extends therefrom to a pin 24 secured to plates 25 which plates are attached on each side of the extension 18 at the rearward end thereof. The plates 25 extend rearwardly and lie closely adjacent the lower end of the beam 1 to provide a reenforcing means for the hinged joint.

For the more effective operation of the device, the upper edge of the beam is provided with a sheet metal cover 26, while a sheet metal shield 27 is attached to the outer side of the beam 1 and projects downwardly therefrom. To the rear upper end of the beam a downwardly and rearwardly extended guard finger 28 is attached, this finger projecting below the sheet metal shield 26 at a point adjacent the rear tractor wheel 29 to prevent the possibility of cornstalks falling under the tractor wheels as they sweep from the shield. This guard finger also acts as an additional support and stiffener for the shield 27 to which it is secured in any suitable manner.

In operation, the beam and its extension are so secured to the tractor that the forward end of the extension will ride on the ground, or at least, closely adjacent the ground line, while the rear upper end of the beam is positioned at a point above the fender on that side of the tractor. As the tractor moves forward, the extension 18, which is positioned some distance in advance of the front tractor wheel 30 passes under and lifts the down corn stalks which are lying in the path of the tractor wheels. It will be seen that, since the extension 18 and the beam 1 are secured to the tractor so that they are in the space between the last picked row and the next unpicked row, that the angle which is assumed by the corn as the inclined upper edge of the beam advances causes the corn to ride entirely over and aside the tractor. When necessary to make a turn, it is advisable to lift the extension 18, which is done by the operator drawing the pull-rod 21 rearwardly, resulting in a forward movement of the secondary rod 23 and the elevation of the tip 18' of the extension to the position shown in broken lines in Fig. 1. To retain the extension 18 in its raised position, which is shown by the broken outline in Fig. 1, a latch 31 adjustably secured on the rod 21 by a set screw 32, is provided. In drawing rearwardly on the rod 21, it is also lifted so that the latch passes through the slot 33' in the bent guide 33 through which the upper end of the rod 21 is inserted.

Having thus described my invention, I claim:

1. In a device of the character described, a rigidly supported immovable plant lifter member arranged at the side of a tractor, a freely movable extension hinged to the forward end of said member, the free end thereof when in operative position extending in proximity to and following the ground line in advance of the front end of the tractor, and means operable from the rear end of the tractor for raising and temporarily holding said extended free end out of contact with the ground line.

2. In a device of the character described, a plant lifter member arranged at the side of a tractor, a support for the rear end of said member attached to the tractor fenders, a support for the forward end of said member attached to the tractor chassis, said member being rigidly connected with said supports so as to be immovable, a freely movable extension hinged to the forward end of said member and extending in proximity to the ground line in advance of the forward end of the tractor, and manually operated means extending from said extension to the rear part of the tractor for raising and lowering said extension, and a device at the rear end of the tractor cooperating with said means for holding said extension in raised position.

3. In a device of the character described, a downwardly and rearwardly inclined beam, together with means for rigidly supporting said beam at the side of a tractor so that said beam is immovable, a freely movable extension pivoted to the forward end of said beam, and manually operated means connected with said extension and extending to the rear end of said tractor for raising and lowering the free end of said extension, and a device at the rear end of the tractor cooperating with said means for holding said extension in raised position.

4. In a device of the character described, a beam, a rod rigidly secured to the rear fender of the tractor, means for rigidly connecting the rear portion of said beam with said rod, a bracket secured to the forward portion of the chassis of said tractor, means for rigidly connecting the forward portion of said beam with said bracket, a freely movable extension hinged to the forward end of said beam and extending to a position adjacent the ground line in advance of the front end of the tractor, and means extending to the rear end of the tractor for swinging the free end of said extension at different heights with relation to the ground line, and a device at the rear end of the tractor cooperating with said means for holding said extension in raised position.

5. In a device of the character described, a downwardly and rearwardly inclined plant lifter member arranged at the side of a tractor, means for rigidly supporting said member from the tractor including a bracket fastened to the forward portion of the tractor, a freely movable extension hinged to the forward end of said member and projecting to a point adjacent the ground line in advance of the tractor to follow the ground line, a lever pivoted intermediate its ends to said bracket, a link connecting one arm of said lever with said extension, and a rod connected with the other end of said lever extending to the rear portion of the tractor.

6. In a device of the character described, a plant lifter member arranged at the side of a tractor, means for rigidly supporting said lifter member from said tractor including a support secured to the radius rods of said tractor and projecting between the front and rear wheels of said tractor, a freely movable extension pivoted to the lower end of said member to follow the ground line, and manually operated means connected with said extension for raising and lowering the free end thereof, said means extending to the rear portion of the tractor, and a device at the rear end of the tractor cooperating with said means to hold said extension in raised position.

7. In a device of the character described, an attachment for a tractor for lifting plants consisting of a beam arranged at the side of the tractor and downwardly inclined, means for so connecting said beam to said tractor so that said beam is immovable with relation thereto, a freely movable extension pivoted to the lower end of said member, and means including a rod extending rearwardly in the direction of the beam to a point in convenient reach of the operator for raising and lowering the free end of said extension, and a device at the rear end of the tractor cooperating with said means for holding said extension in raised position.

In testimony whereof, I have hereunto set my hand this 9th day of September, 1929.

HENRY SYNCK.